United States Patent [19]

Fuchs et al.

[11] Patent Number: 5,107,622

[45] Date of Patent: Apr. 28, 1992

[54] SEALING FOR CONTAINERS, IN PARTICULAR FOR REFRIGERATED CONTAINERS

[75] Inventors: Hans-Georg Fuchs, Buxtehude/Hedendorf; Siegfried Glang, Hamburg; Gerda Luszek, Dohren, all of Fed. Rep. of Germany

[73] Assignees: Phoenix Aktiengesellschaft, Hamburg; Graaff GmbH, Hildensheim, both of Fed. Rep. of Germany; a part interest

[21] Appl. No.: 528,738

[22] Filed: May 24, 1990

[30] Foreign Application Priority Data

May 25, 1989 [DE] Fed. Rep. of Germany ....... 3917054

[51] Int. Cl.⁵ .............................................. E06B 7/16
[52] U.S. Cl. ...................................... 49/484; 49/485; 49/489; 49/495
[58] Field of Search ................. 49/484, 488, 489, 493, 49/495, 458

[56] References Cited

U.S. PATENT DOCUMENTS

| 2,622,286 | 12/1952 | Beck | 49/489 X |
|---|---|---|---|
| 3,177,924 | 4/1965 | McPhail | 49/484 X |
| 3,430,384 | 3/1969 | Malenfant | 49/489 X |
| 3,448,543 | 6/1969 | Multer | 49/470 |
| 3,518,792 | 7/1970 | Williamson et al. | 49/495 |
| 3,837,120 | 9/1974 | Hanks et al. | 49/489 |
| 3,886,686 | 6/1975 | Urbanick | 49/495 X |
| 4,006,562 | 2/1977 | Belanger et al. | 49/470 X |
| 4,015,368 | 4/1977 | Court et al. | 49/489 X |
| 4,034,511 | 7/1977 | Bursk | 49/495 X |
| 4,119,325 | 10/1978 | Oakley et al | 49/493 X |
| 4,527,807 | 7/1985 | Urbanick . | |
| 4,850,144 | 7/1989 | Gresham et al. | 49/484 X |
| 4,891,913 | 1/1990 | Shimura et al. | 49/493 |

FOREIGN PATENT DOCUMENTS

| 234294 | 6/1961 | Australia | 49/484 |
|---|---|---|---|
| 947904 | 1/1964 | United Kingdom | 49/484 |
| 2026067 | 1/1980 | United Kingdom | 49/484 |
| 2195135 | 3/1988 | United Kingdom . | |

Primary Examiner—Renee S. Luebke
Assistant Examiner—Jerry Redman
Attorney, Agent, or Firm—Collard, Roe & Galgano

[57] ABSTRACT

A seal for a container, in particular, a refrigerated container having a door or two wings of the door, and having a door jamb having a corner zone comprising:

(a) a strand shaped outer sealing profile made of elastomeric material;

(b) the door having an outer side, the door having an inner side; and the door having a face side; and the outer profile being fastened on the face side of the container door or wing of the door;

(c) the outer profile having two bow-shaped sealing lips, one of which is an outer lip for sealing the gap between the container door and the door jamb, and, respectively, the gap between the two wings of the door, with the outer lip embracing the corner zone of the door jamb and wing of the door, respectively;

(d) a strand-shaped inner sealing profile serving as an inner seal being an elastomer arranged on the face side of the container door or wing of the door;

(e) a first C-shaped rail for anchoring the inner sealing profile and a second C-shaped rail for anchoring the outer sealing profile, each of the C-shaped rail having an adequate gap width s as well as an adequate depth v and base width w, the rail extending around the face side of the container door or the wing of the door, each rail having the anchoring portion defined by two holding flanges spaced apart by gap width s;

(f) a one-sided hammer head for the outer sealing profile and another for the inner sealing profile; each hammer head having a thickness approximately corresponding with the depth v of the rail; the inner profile having an oppositely disposed barb foot and the outer profile having an oppositely disposed barb foot, the hammer head and said barb foot of each profile being seated within the anchoring portion of the holding flanges; and (g) the hammer head of the outer sealing profile being directed at the outer side of the door.

12 Claims, 3 Drawing Sheets

SEALING FOR CONTAINERS, IN PARTICULAR FOR REFRIGERATED CONTAINERS

BACKGROUND OF THE INVENTION

1. Field of the Invention

The present invention relates to a seal for containers, in particular, for refrigerated containers.

2. Brief Description of the Prior Art

A sealing means of the type which constitutes part of the background prior to the present invention is known from DE-O-19 22 789 and DE-A-38 08 520. With such a type of sealing means, it has been anchored heretofore on the face side of the door wing by means of a mechanical fastening system in the form of additional strips with screws, pop rivets or the like. However, such fastening elements lead not infrequently to wear of the elastomer profile particularly due to the interaction of different materials with different properties (e.g. hardness, coefficient of expansion, corrosion). Futhermore, the replacement (renewal, refitting) of the seals when needed, is based upon extensive and costly additional work. Moreover, the sealing systems of the type used in the prior art before now do not satisfy the highest requirements with respect to their sealing capacity. This is especially when a high temperature gradient exists between the interior of the container and the ambient exterior environment, which is normally the case with refrigerated containers (e.g. inside temperature equals $-20°$ C., and the outside temperature equals $+30°$ C.).

SUMMARY OF THE INVENTION

It is an object of the present invention to simplify, within the framework of a more efficient seal, particularly for refrigerated containers, the anchoring of the sealing profile which is made of an elastomeric material, in such a way that the prior art fastening systems can be dispensed with, and specifically to provide stable anchoring, on the one hand, and easy exchangeability on the other hand.

The above object is accomplished in accordance with the present invention by providing a seal for a container, in particular, a refrigerated container having a door or two wings of the door, and having a door jamb having a corner zone comprising:

(a) a strand shaped outer sealing profile made of elastomeric material;

(b) the outer profile being fastened on the face side of the container door or wing of the door, the door having an outer side, the door having an inner side; and the door having a face side; and (c) the outer profile having two bow-shaped sealing lips, one of which is an outer lip for sealing the gap between the container door and the door jamb, and, respectively, the gap between the two wings of the door, with the outer lip embracing the corner zone of the door jamb and wing of the door, respectively;

(d) a strand shaped inner sealing profile serving as an inner seal being an elastomeric material arranged on the face side of the container door or wing of the door;

(e) a first C-shaped rail for anchoring the inner sealing profile and a second C-shaped rail for anchoring the outler sealing profile, each of said C-shaped rail having an adequate gap width s, an adequate depth v, and an adequate base width w, said rail extending around the face side of the container door or the wing of the door, each said rail having an anchoring defined by two holding flanges spaced apart by gap width s;

(f) a one-sided hammer head for said outer sealing profile and another one-sided hammer head for said inner sealing profile; each hammer head having a thickness approximately corresponding with the depth v of the rail; said inner profile having an oppositely disposed barb foot and said outer profile having another oppositely disposed barb foot, said hammer head and said barb foot of each profile being seated within the anchoring portion of the holding flanges; and (g) said hammer head of the outer sealing profile being directed at the outer side of the door.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing wherein similar reference characters denote similar elements throughout the several views.

DETAILED DESCRIPTION OF PREFERRED EMBODIMENT

Figure 1:
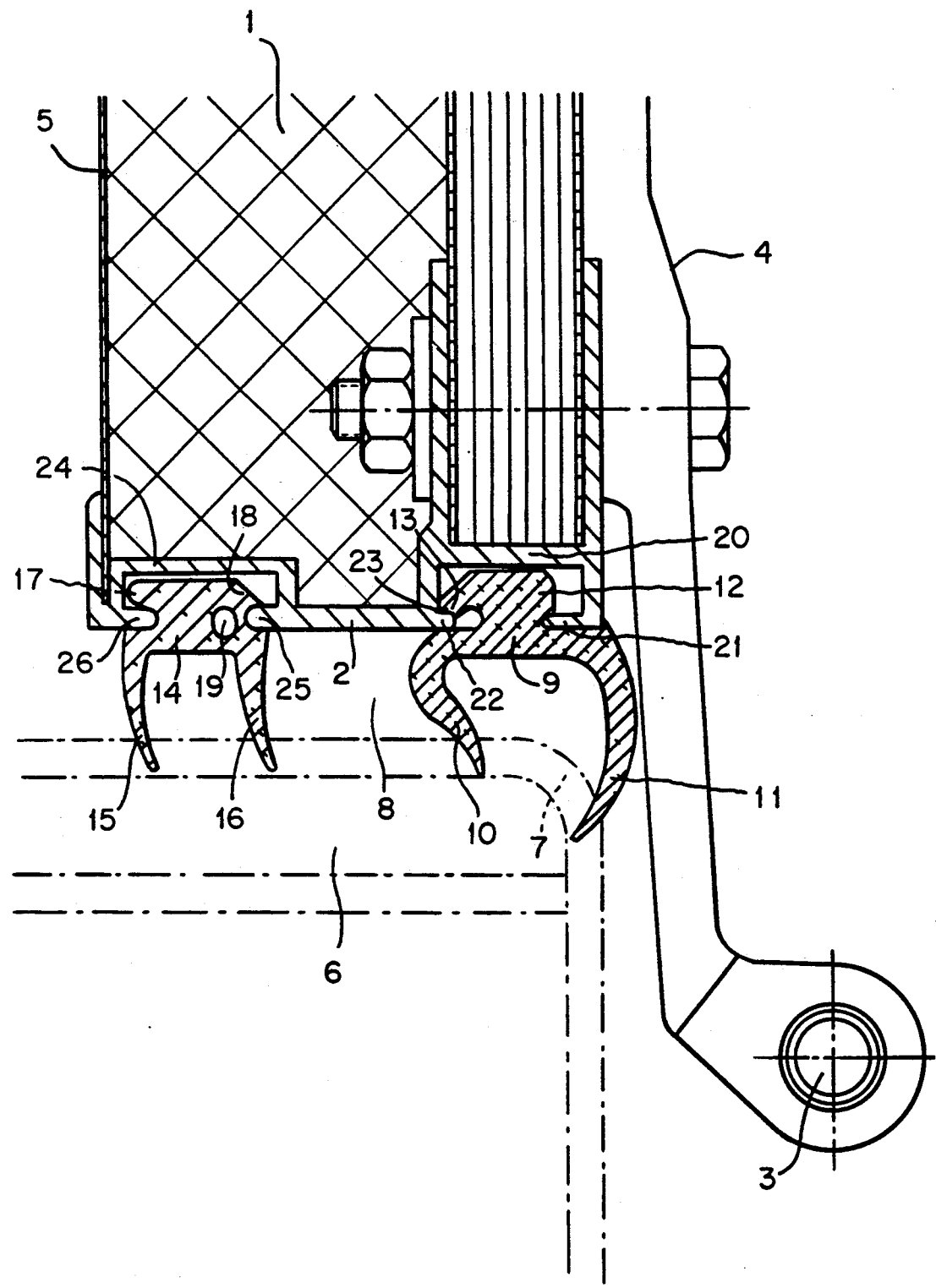
FIG. 1 shows a partial section view of a first embodiment of a double seal between the door and the jamb of the container according to the present invention.

Turning now in detail to the drawings, the refrigeration device has a container door 1 having a face 2 for the container door, with the door having a hinge 3. The container door has an outer side 4 and has an inner side 5. Door jamb 6 has a corner zone 7 for the door jamb. Gap 8 is the spaced distance between the door face 2 and the door jamb 6. There is an outer sealing profile 9 with sealing lips 10 and 11 in FIG. 2 there is an outer sealing profile 9 with an additional groove 29, which is filled with a sealing compound 30. There is an inner sealing profile 14 with sealing lips 15 and 16 in FIG. 1. In FIG. 2 there is an inner sealing profile 27 with a hose-like sealing part 28. There are hammer head parts 12 and 17 for the outer and inner profile respectively. There is a bow-shaped foot 13 of the barb for the outer profile 9.

Foot 18 of the barb in combination with the profile duct 19 is for the inner profile. Rail 20 enfolds and grips the outer profile, while rail 24 contains and holds the inner profile. Rail 20 has holding flanges 21 and 22, while rail 24 has holding flanges 25 and 26. Rail 20 has rail corner zone 23.

Figures 2, 3:
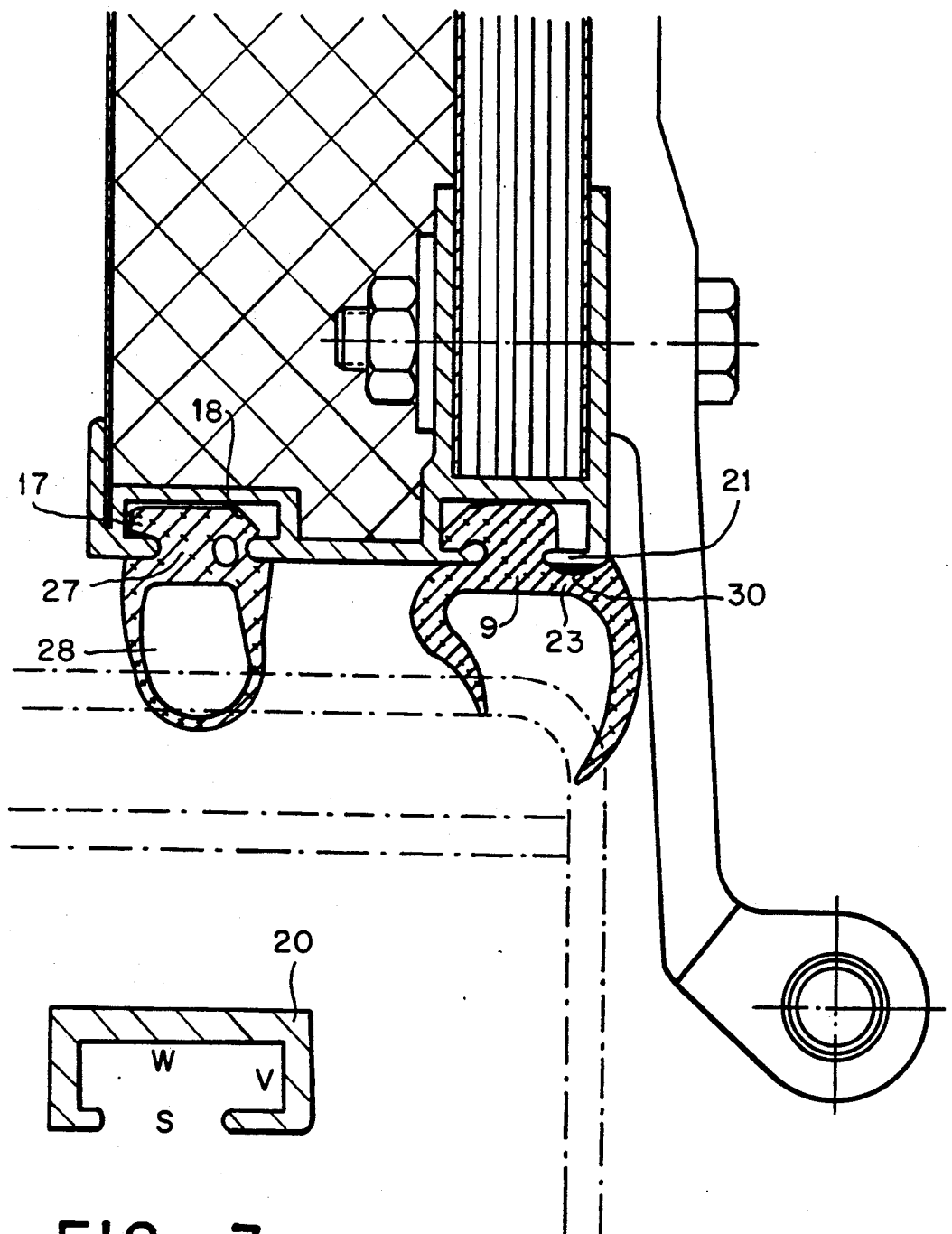
FIG. 2 shows a partial section view of a second embodiment of a double seal between the door and the jamb of the container according to the present invention.
FIG. 3 shows an enlarged section view of the C-shaped rail and its dimensional parameters.
Figure 4:
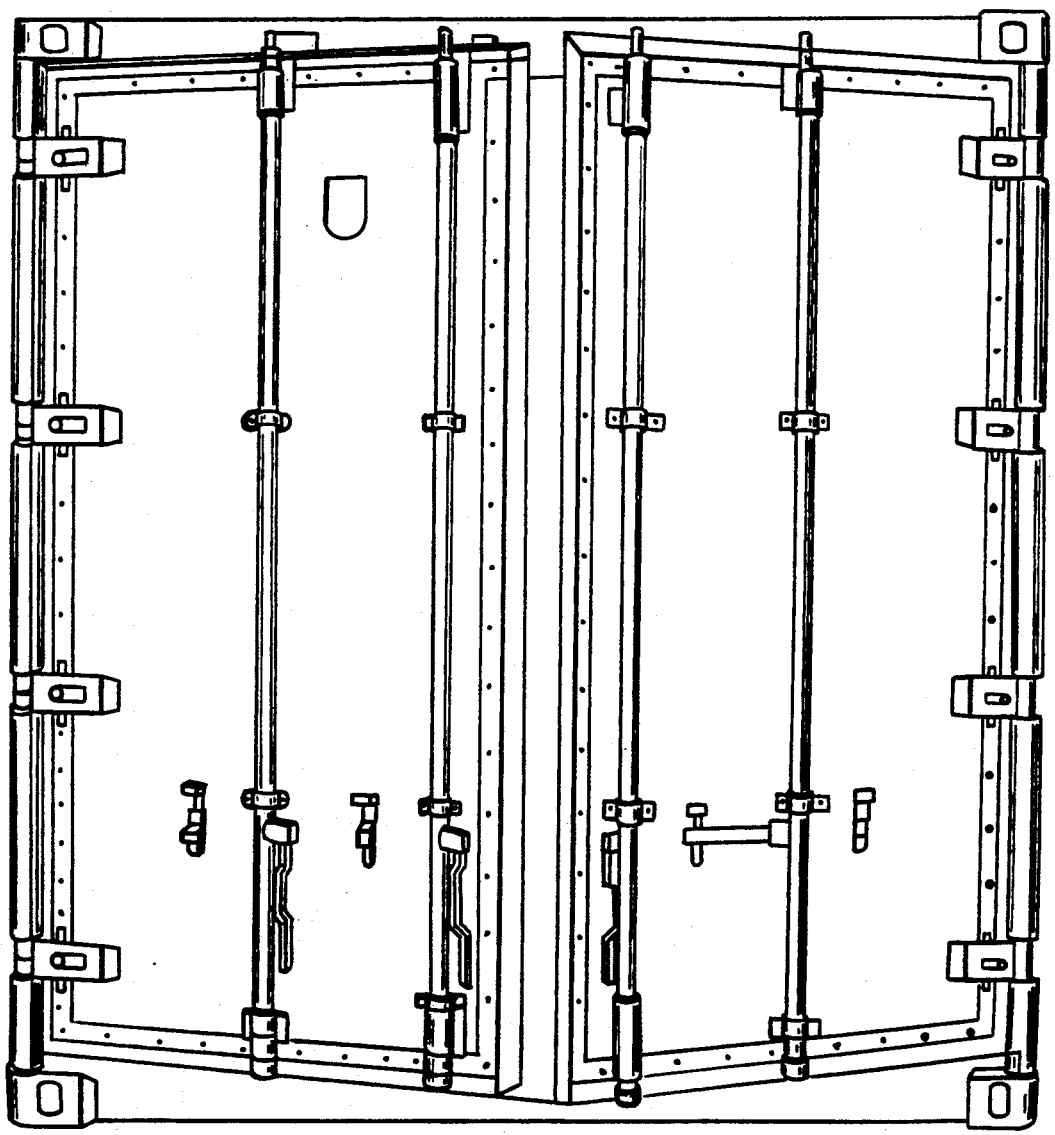

As shown in FIG. 1, the hammer head 12 of the strand shaped outer sealing profile 9, which sits on the holding flange 21, is directed toward the outer side 4 of the door. The opposite bow-shaped, beaklike foot 13 of the barb extends with an angle of about 45 degrees toward the corner 23 of the rail, where it is anchored by means of the holding flange 22. This structure of the profile within the anchoring zone of the C-shaped rail 20 assures particularly high resistance to being torn out, which is of great importance especially with the outer sealing profile 9. With the strand shaped inner sealing profile 14, the highest possible tolerance compensation is required when the gap 8 is sealed, in addition to resistance to being torn out. In the present case, such tolerance compensation is obtained by means of the elastic foot 18 of the barb. Viewed cross-sectionally, this foot of the barb has a substantially triangular shape and, within its clamping zone, has a duct 19 extending in the lengthwise direction of the profile. The duct 19 is positioned on approximately the same level with the holding flanges 25 and 26 and has an oval cross-sectional surface. The hammer head 17 of the inner sealing profile 14 is directed toward the inner side 5 of the door. This measure, too, assures that the inner sealing profile is highly resistant to being torn out.

The inner profile 14 as shown in FIG. 1 has two bow-shaped sealing lips 15 and 16 which when viewed from the outer side 4 of the door, have a concave shape. As shown in FIG. 2, the sealing part of the inner sealing profile 27 is structured in the form of a hose 28. The sealing capacity and the tolerance compensation of the inner profile are particularly adavantageous with this embodiment of FIG. 2.

FIG. 3 shows a rail 20, which preferably has the following dimensional parameters with respect to gap width s, internal or inside depth v, and internal or inside base width w:

Gap width s is greater than or equal to 10 mm;
Depth v (inside) is greater than or equal to 4 mm; and
Base width w (inside) is greater than or equal to 20 mm.

In another embodiment the outer sealing profile 9 as shown in FIG. 2 can have a groove 29 extending in the lengthwise direction of the profile, with this groove being filled with a sealing compound 30. The sealing compound may be a conventional adhesive substance, such as known epoxy resin.

The sealing of the gap between the door of the container and the jamb of the door is described above within the embodiments of the present invention. However, a container normally has two door wings (as described in DE-A-38 08 520, or DE-O-19 22 789), in which case, of course, the gap between the two door wings has to be sealed as well. In that case, the right wing of the door, for example (viewed from the outside), is fitted with the seal of the invention, extending all around (i.e., all four side faces). The left wing of the door, on the other hand, is fitted with this seal only on three side faces. However, the rails of the side face opposing the side face of the right wing of the door are equipped with a compensating or filling profile for the purpose of obtaining a smooth surface for the face. The four corners of the frame are preferably manufactured by the injection molding process.

The profiles 9, 14, and 27 are elastomeric materials and may be made of a rubber mixture based on polychloroprene (CP), ethylene-propylene-diene copolymer (EPDC), nitrile rubber, (NRB), silicone rubber, or other types of rubber having resistance to swelling, weathering, chemicals and minus temperatures (to −40° C. as the embrittling point).

In addition, the profiles 9, 14, and 27 have a Shore A hardness of 35 to 80 degrees, and preferably 60 to 70 degrees.

The use of four strand shaped profiles 9, 14 and 27 or the use of three of these profiles and one strand shaped compensating or filling profile form a sealing frame extending all around the door. The corners of said sealing frame may be manufactured by the injection molding process.

While only two embodiments of the prsent invention have been shown and described, it is to be understood that many changes and modifications may be made thereunto with out departing from the spirit and scope of the invention as defined in the appended claims.

While only several embodiments of the present invention have been shown and described, it will be obvious to those of ordinary skill in the art that many modifications may be made to the present invention without departing from the spirit and scope thereof.

What is claimed is:

1. The combination of a seal and a container having a door and having a door jamb having a corner zone comprising:

(a) a strand shaped outer sealing profile made of elastomeric material;

(b) said door having an outer side, said door having an inner side, and said door having a face side, and said outer profile being fastened on the face of the container door or wing of the door, (c) said outer profile having two bow-shaped sealing lips, one of which is an outer lip for sealing a gap between the container door and the door jamb, and, respectively, a gap between the two wings of the door, with the outer lip embracing the corner zone of the door jamb and the wing of the door, respectively;

(d) a strand shaped inner sealing profile serving as an inner seal being an elastomeric material arranged on the face side of the container door or wing of the door;

(e) a first C-shaped rail for anchoring the inner sealing profile and a second C-shaped rail for anchoring the outer sealing profile, each of said C-shaped rails having an adequate gap width s, an adequate depth v, and an adequate base width w, said rail extending around the face of the container door or the wing of the door, each said rail having an anchoring portion defined by two holding flanges spaced apart by gap width s;

(f) a one-sided hammer head for said outer sealing profile and another one-sided hammer head for said inner sealing profile; each hammer head having a thickness approximately corresponding with the depth v of the rail; said inner profile having an oppositely disposed barb foot and said outer profile having another oppositely disposed barb foot, said hammer head and said barb foot of each profile being seated within the anchoring portion of the respective holding flanges;

(g) said hammer head of the outer sealing profile being directed at the outer side of the door, said hammer head of the inner sealing profile being directed at the inner side of the door;

(h) wherein the barb foot has a beaklike shape and extends toward the corner of the rail with an angle of about 45°, with the thickness of the barb foot being about half the thickness of the hammer head;

(i) wherein said outer sealing profile comprises the combination of the hammer head and the barb foot;

(j) wherein the inner sealing profile has a clamping zone and has a barb foot viewed cross-sectionally which has a substantially triangular shape, said inner sealing profile having a duct extending in the lengthwise direction of the profile and arranged in the clamping zone of said barb foot; and (k) wherein said inner sealing profile comprises the combination of the hammer head and the barb foot.

2. The seal as defined in claim 1, wherein the inner profile has two bow-shaped sealing lips; and each of said lips having a concave shape when viewed from the outer side of the door.

3. The seal as defined in claim 1, wherein said inner profile has a sealing part shaped in the form of a hose:

4. The seal as defined in claim 1, wherein each rail has a minimum depth v of 4 mm.

5. The seal as defined in claim 1, wherein each rail has a minimum base width w of 20 mm.

6. The seal as defined in claim 1, wherein each rail has a minimum gap width s of 10 mm.

7. The seal as defined in claim 1, wherein the hammer head of the inner sealing profile is directed at the inner side of the door.

8. The seal as defined in claim 1, wherein the duct is located at about the same level as in the holding flanges, and said duct having an oval-shaped cross-sectional surface.

9. The seal as defined in claim 1, wherein the outer profile and the inner profile each comprises a rubber mixture selected from the group consisting of polycholoroprene, ethylene-propylenediene copolymer, nitrile rubber, silicone rubber, or other types of rubber having resistance to swelling, weathering, chemicals and minus temperatures (to $-40°$ C. as the embrittling point).

10. The seal as defined in claim 1, wherein the outer profile and the inner profile each has a Shore A hardness of 35 to 80.

11. The seal as defined in claim 1, wherein the container door has two wings.

12. A seal for a container, in particular, a refrigerated container having a door or two wings of the door, and having a door jamb having a corner zone comprising:

(a) a strand shaped outer sealing profile made of elastomeric material;

(b) said door having an outer side, said door having an inner side, and said door having a face side, and said outer profile being fastened on the face side of the container door or wing of the door, (c) said outer profile having two bow-shaped sealing lips, one which is an outer lip for sealing a gap between the container door and the door jamb, and, respectively, a gap between the two wings of the door, with the outer lip embracing the corner zone of the door jamb and wing of the door, respectively;

(d) a strand shaped inner sealing profile serving as an inner seal being an elastomeric material arranged on the face side of the container door or wing of the door;

(e) a first C-shaped rail for anchoring the inner sealing profile and a second C-shaped rail for anchoring the outer sealing profile, each of said C-shaped rails having an adequate gap width s, an adequate depth v, and an adequate base width w, said rail extending around the face side of the container door or the wing of the door, each said rail having an anchoring portion defined by two holding flanges spaced apart by gap width s;

(f) a one sided hammer head for said outer sealing profile and another one-sided hammer head for said inner sealing profile; each hammer head having a thickness approximately corresponding with the depth v of the rail; said inner profile having an oppositely disposed barb foot and said outer profile having another oppositely disposed barb foot, said hammer head and said barb foot of each profile being seated within the anchoring portion of the respective holding flanges;

(g) said hammer head of the outer sealing profile being directed at the outer side of the door;

(h) wherein the outer sealing profile has a groove facing the outer side of the door within the holding flange and extending in the lengthwise direction of the profile, said groove being filled with a sealing compound.

* * * * *